United States Patent
Li et al.

(10) Patent No.: US 9,894,531 B2
(45) Date of Patent: Feb. 13, 2018

(54) APPARATUS, METHOD, AND SOFTWARE SYSTEMS FOR SMARTPHONE-BASED FINE-GRAINED INDOOR LOCALIZATION

(71) Applicant: University of Florida Research Foundation, Inc., Gainesville, FL (US)

(72) Inventors: Xiaolin Li, Gainesville, FL (US); Kaikai Liu, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 257 days.

(21) Appl. No.: 14/129,213

(22) PCT Filed: Dec. 3, 2013

(86) PCT No.: PCT/US2013/072808
§ 371 (c)(1),
(2) Date: Dec. 24, 2013

(87) PCT Pub. No.: WO2014/089040
PCT Pub. Date: Jun. 12, 2014

(65) Prior Publication Data
US 2015/0156637 A1    Jun. 4, 2015

Related U.S. Application Data

(60) Provisional application No. 61/732,528, filed on Dec. 3, 2012.

(51) Int. Cl.
*H04W 72/00* (2009.01)
*H04W 16/14* (2009.01)
(Continued)

(52) U.S. Cl.
CPC ............ *H04W 16/14* (2013.01); *G01S 1/725* (2013.01); *G01S 5/30* (2013.01); *H04W 56/002* (2013.01); *H04W 64/00* (2013.01)

(58) Field of Classification Search
None
See application file for complete search history.

(56) References Cited

U.S. PATENT DOCUMENTS

| 8,566,022 | B1* | 10/2013 | Starenky | H04W 64/00 340/988 |
| 2005/0008169 | A1* | 1/2005 | Muren | H04R 27/00 381/92 |

(Continued)

FOREIGN PATENT DOCUMENTS

WO    WO 2004/057361 A1    7/2004

OTHER PUBLICATIONS

International Search Report and Written Opinion dated Mar. 14, 2014 in connection with Application No. PCT/US2013/072808.
(Continued)

*Primary Examiner* — Shantell L Heiber
(74) *Attorney, Agent, or Firm* — Wolf, Greenfield & Sacks, P.C.

(57) ABSTRACT

Techniques for accurate, low-complexity, scalable indoor localization. Low-complexity anchor nodes generate acoustic beacon signals, which are passively detectable by a mobile device, which may be unmodified smartphones operating in an acoustic frequency range. The acoustic beacon signals are modulated via codes in a boundary band of audio and ultrasound frequencies, imperceptible to humans yet detectable via a voice microphone of an unmodified smartphone. An application on the mobile device passively captures the acoustic beacon signals and determines relative distances to the anchor nodes. Localization and distance update techniques, implemented on the mobile device and/or a remote server, determines and updates in real-time the location of the mobile device. The system may be scalable to support any number of mobile devices. Based on the tracked location, the indoor localization system may provide (Continued)

The structure of the central Controller indoor location-based-services (LBS) to the mobile devices, and transmit to the mobile device information relevant to its location.

14 Claims, 6 Drawing Sheets

(51) Int. Cl.
*G01S 1/72* (2006.01)
*G01S 5/30* (2006.01)
*H04W 56/00* (2009.01)
*H04W 64/00* (2009.01)

(56) References Cited

U.S. PATENT DOCUMENTS

| | | | | |
|---|---|---|---|---|
| 2007/0093237 A1* | 4/2007 | Bayne | .................. | H04W 64/00 455/414.2 |
| 2007/0200672 A1* | 8/2007 | McBride | .............. | B60R 25/245 340/5.72 |
| 2008/0171559 A1* | 7/2008 | Frank | ..................... | G06Q 30/02 455/456.5 |
| 2009/0093978 A1* | 4/2009 | Sadri | ......................... | C21B 7/12 702/56 |
| 2009/0154294 A1 | 6/2009 | Jeong et al. | | |
| 2009/0316529 A1* | 12/2009 | Huuskonen | ............... | G01S 5/30 367/124 |
| 2010/0061186 A1 | 3/2010 | Carotenuto | | |
| 2011/0018687 A1 | 1/2011 | Holm | | |
| 2014/0003606 A1* | 1/2014 | Birnbaum | ............. | H04W 48/04 380/270 |
| 2014/0004826 A1* | 1/2014 | Addy | .................... | H04W 12/06 455/411 |
| 2014/0099971 A1* | 4/2014 | Lim | ..................... | G01S 5/0263 455/456.1 |

OTHER PUBLICATIONS

International Preliminary Report on Patentability dated Jun. 18, 2015 in connection with Application No. PCT/US2013/072808.
Azizyan et al., Surroundsense: mobile phone localization via ambience fingerprinting. Proceedings of 15th Annual MobiCom, ACM. 2009:261-72.
Bahl et al., Radar: an in-building rf-based user location and tracking system. INFOCOM, 19th Annual Joint Conference of the IEEE Computer and Communications Societies. 2000;2:775-84.
Chen et al., Fm-based indoor localization. Proceedings of the 10th International Conference on Mobile Systems, Applications, and Services. 2012:169-82.
Constandache et al., EnLoc: Energy-Efficient Localization for Mobile Phones. IEEE INFOCOM 2009 Proceedings. 2009:2716-20.
Constandache et al., Did you see bob?: human localization using mobile phones. Proceedings of the 16th Annual International Conference on Mobile Computing and Networking. 2010:149-60.
Guvenc et al., Analysis of a Linear Least-Squares Localization Technique in LOS and NLOS Environments. Vehicular Technology Conference, 65th IEEE. 2007:1886-1890.
Heussner, Sound-triggered smartphone ads seek you out. Adweek. Dec. 7, 2011. Accessed online Mar. 11, 2015 at: http://www.adweek.com/news/advertising-branding/sound-triggered-smartphone-ads-seek-you-out-136901.
Kjaergaard et al., EnTracked: Energy-Efficient Robust Position Tracking for Mobile Devices. Proceedings of the 7th International Conference on Mobile Systems, ACM. 2009:221-34.
Lee et al., Ranging in a dense multipath environment using an UWB radio link. IEEE Journal on Selected Areas in Communications. Dec. 2002;20(9):1677-83.
Li et al., Robust statistical methods for securing wireless localization in sensor networks. Information Processing in Sensor Networks, Fourth International Symposium on IEEE. 2005:91-8.
Lin et al., Energy-accuracy trade-off for continuous mobile device location. Proceedings of the 8th International Conference on Mobile Systems, Applications, and Services, ACM. 2010:285-98.
Liu et al., Acoustic ranging and communication via microphone channel. Global Communications Conference IEEE. Dec. 3, 2012:291-296.
Liu et al., Low complexity tri-level sampling receiver design for uwb time-of-arrival estimation. Communications (ICC) of IEEE International Conference on IEEE. 2011:1-5.
Mandal et al., Beep: 3d indoor positioning using audible sound. Consumer Communications and Networking Conference. 2005:348-53.
Minami et al., Dolphin: A Practical Approach for Implementing a Fully Distributed Indoor Ultrasonic Positioning System. UbiComp. 2004:347-65.
Patwari et al., Locating the nodes: cooperative localization in wireless sensor networks. IEEE Signal Processing Magazine, IEEE. Jul. 2005;22(4):54-69.
Peng et al., BeepBeep: A High Accuracy Acoustic Ranging System Using COTS Mobile Devices. Proceedings of the 5th International Conference on Embedded Networked Sensor Systems, ACM. 2007:1-14.
Priyantha et al., The cricket location-support system. Proceedings of the 6th Annual International Conference on Mbile Computing and Networking (MOBICOM 2000). Aug. 2000:237-66.
Valin et al., Robust sound source localization using a microphone array on a mobile robot. Intelligent Robots and Systems, Proceedings of IEEE/RSJ International Conference. 2003;2:1228-33.

* cited by examiner

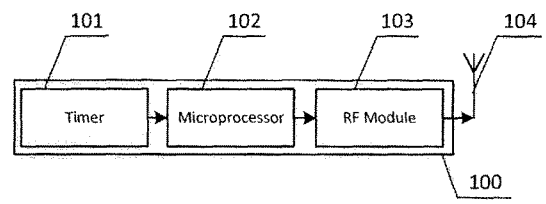
Fig 1 The structure of the central Controller
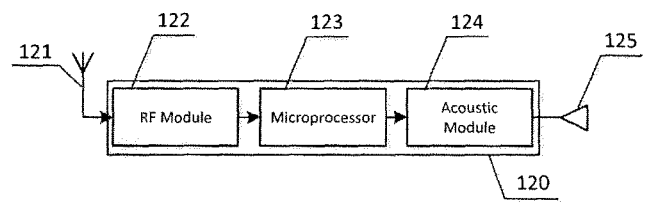
Fig 2 The structure of the Anchor node
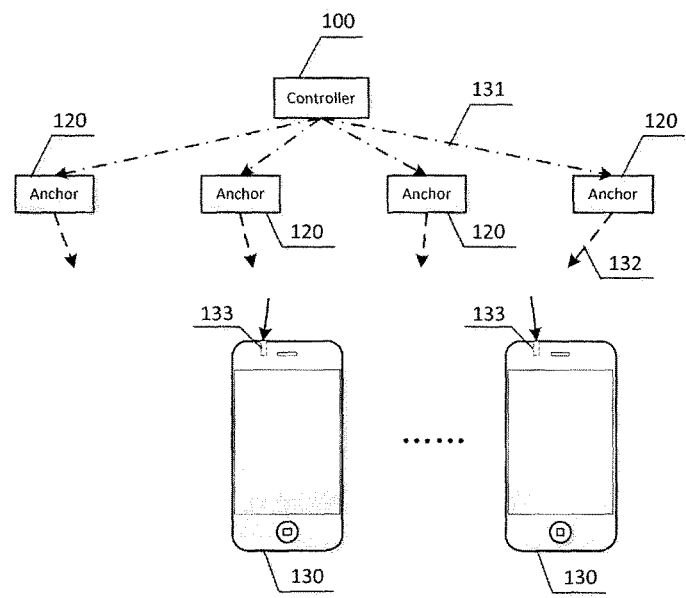
Fig 3 Indoor localization scenario

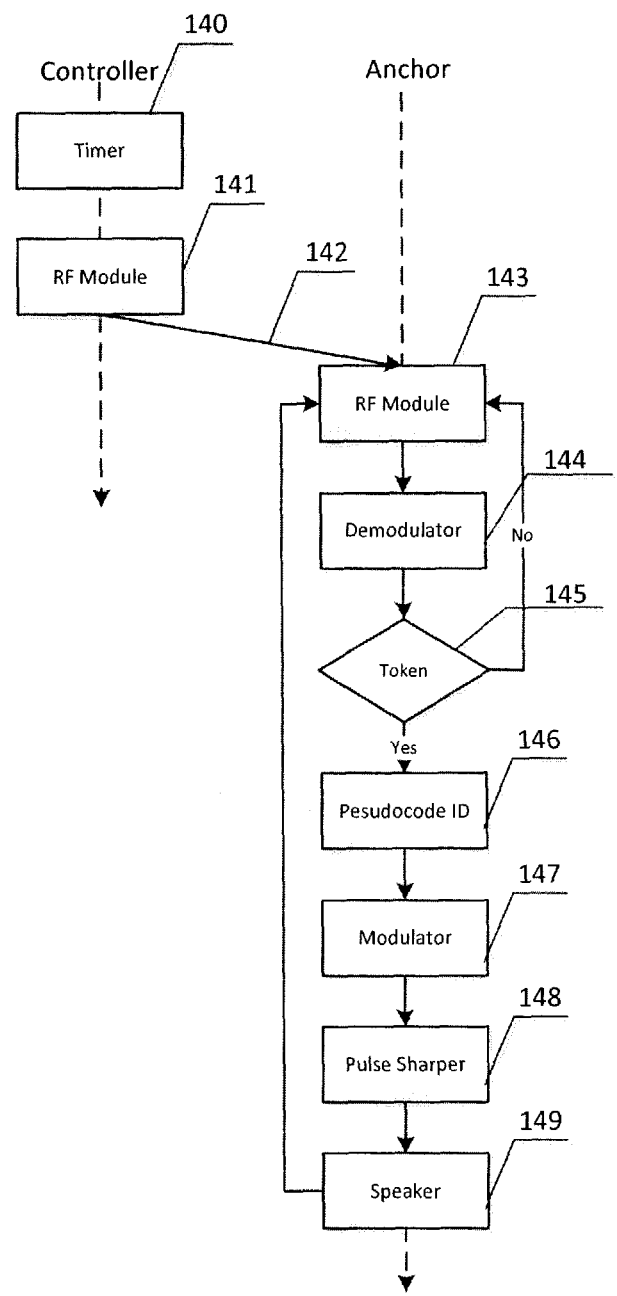
Fig 4 Protocol between the Controller and Anchor

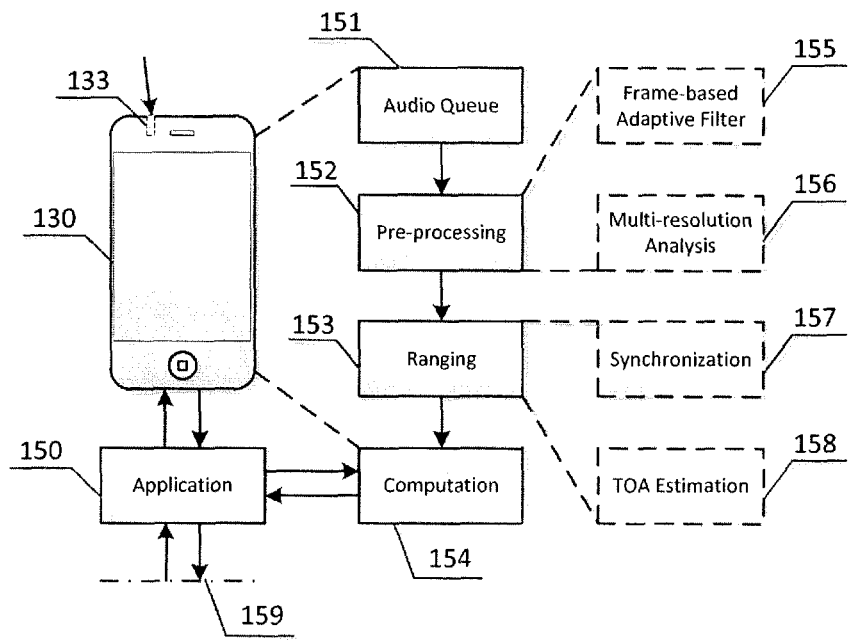
Fig 5 Processing under smartphone
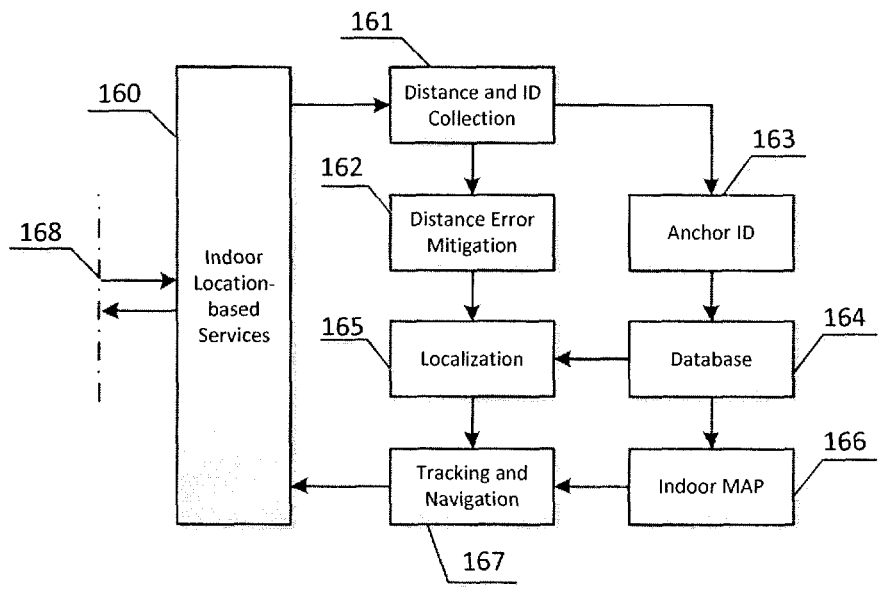
Fig 6 Processing under Server

APPARATUS, METHOD, AND SOFTWARE SYSTEMS FOR SMARTPHONE-BASED FINE-GRAINED INDOOR LOCALIZATION

CROSS-REFERENCE TO RELATED APPLICATIONS

This application is a National Phase Entry of international PCT patent application No. PCT/US2013/072808, entitled "APPARATUS, METHOD, AND SOFTWARE SYSTEMS FOR SMARTPHONE-BASED FINE-GRAINED INDOOR LOCALIZATION" filed on Dec. 3, 2013, which claims priority to and the benefit of U.S. Provisional Application Ser. No. 61/732,528, entitled "APPARATUS, METHOD, AND SOFTWARE SYSTEMS FOR SMARTPHONE-BASED FINE-GRAINED INDOOR LOCALIZATION" filed on Dec. 3, 2012. The entire contents of these applications are incorporated herein by reference in their entirety.

BACKGROUND OF INVENTION

Indoor localization technology aims to automatically locate devices or people in indoor environments, such as inside buildings. In many indoor scenarios, the Global Positioning System (GPS) is typically inaccessible due to blockage of satellite signals. Consequently, other techniques have been developed that use a network of interconnected devices to track the location of a target. For example, techniques that use time-of-arrival (TOA) estimations have been developed. These techniques obtain signal flight distance as a pseudorange, and trilateration methods utilize these pseudoranges to calculate location information.

Mainly, two categories of approaches have been proposed to solve this problem. The first type of solution utilizes Impulse Radio Ultra-Wideband (IR-UWB) technique for indoor TOA-based ranging, as ranging precision typically increases with the bandwidth of the operating signal. Using UWB signals has attracted significant research interests and become a standard as IEEE 802.15.4a. The second type of solution utilizes ultrasound signals to perform ranging. Compared with electromagnetic signals used in a IR-UWB device, aerial acoustic signals are more pervasive and can typically achieve ranging accuracy with lower hardware cost. Due to slower transmission speed of acoustic signals, even a several kHz signal bandwidth can result in centimeter-level ranging accuracy.

BRIEF SUMMARY OF INVENTION

In some aspects, the invention relates to a system that determines a position of a portable device using acoustic signals.

In some embodiments, the portable device may be an unmodified smart phone. The acoustic signals may be received through a voice microphone of the device.

In some embodiments, the acoustic signals may have a frequency bandwidth of 16-22 KHz or, in other embodiments, of 17-20 KHz, for example.

In some embodiments, position may be determined based on one-way ranging techniques. Such techniques may be based on acoustic signals transmitted by a plurality of sources within a region. Accordingly, any number of portable devices may simultaneously determine their positions within the region.

Such a system may be used in conjunction with a wide area network through which information may be provided to portable electronic devices in any of multiple regions. The wide area network may be "the Cloud." Through the wide area network, a portable device that is network enabled may access location information. The location information may relate to signal sources within a region or may be other information that enables a portable device to determine its position within a region. Alternatively or additionally, the information may relate to content to be rendered to a user of the portable device at positions within a region.

Accordingly, the invention may be embodied in any of a number of ways. The invention, for example, may be embodied as a system, or any constituent part, or a method of operation of the system, or any constituent part. Alternatively or additionally, the invention may be embodied as computer-executable instructions that control the system or any constituent part.

It should be appreciated that all combinations of the foregoing concepts and additional concepts discussed in greater detail below (provided that such concepts are not mutually inconsistent) are contemplated as being part of the inventive subject matter disclosed herein.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1 is a schematic illustration of an example of a central controller for a region or a plurality of regions, in accordance with some embodiments;

FIG. 2 is a schematic illustration of an example of an anchor node, in accordance with some embodiments;

FIG. 3 is a schematic illustration of an example of a region of an indoor localization system, in accordance with some embodiments;

FIG. 4 is a functional block diagram providing an example of interaction between a central controller and an anchor node, in accordance with some embodiments;

FIG. 5 is a functional block diagram providing an example of processing performed in a smartphone, in accordance with some embodiments;

FIG. 6 is a functional block diagram providing an example of processing performed in a remote server, in accordance with some embodiments;

DETAILED DESCRIPTION OF INVENTION

Figure 7:
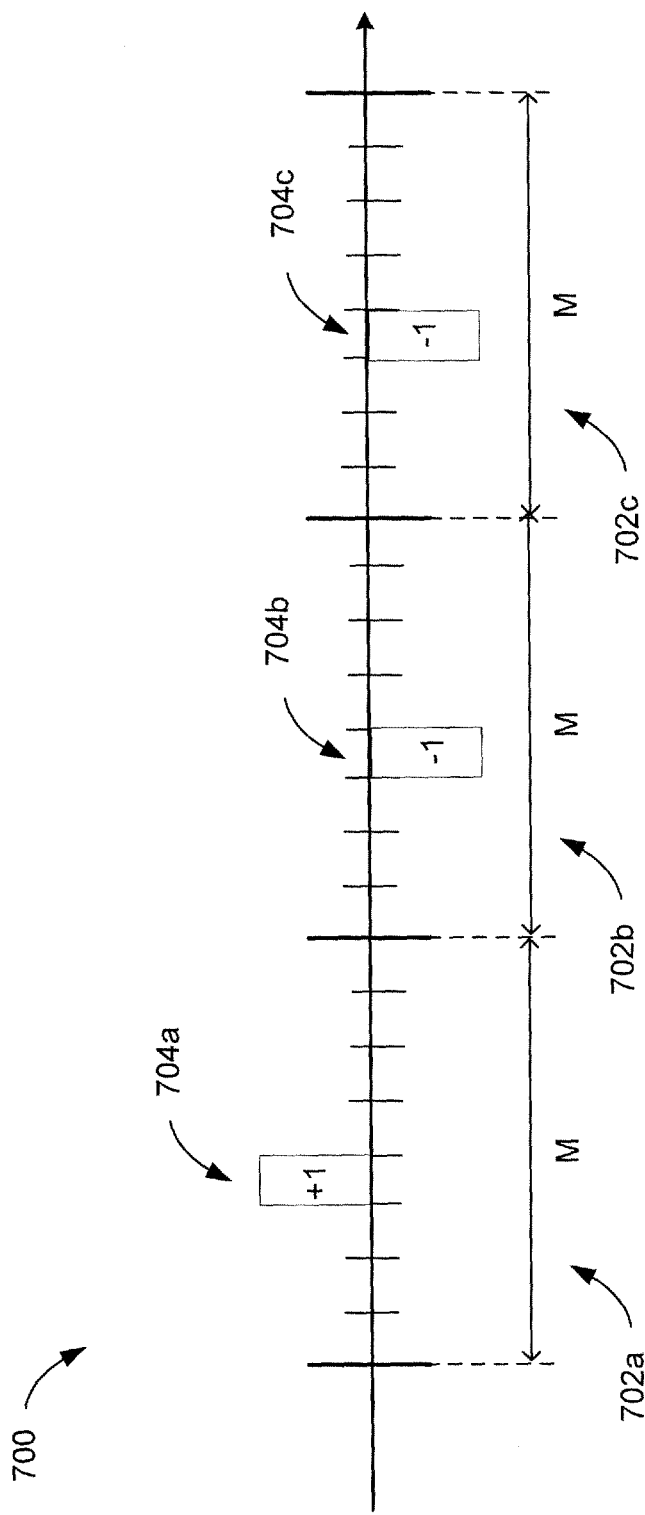
FIG. 7 is a sketch of an example of coordinated transmission broadcasts from anchor nodes, in accordance with some embodiments.

The inventors have recognized and appreciated that significant advances in the nature of information delivery may be achieved with an accurate, accessible, and scalable indoor localization system, and have recognized that such a localization system may be achieved by enabling existing mobile devices to perform passive, low-complexity acoustic localization. The inventors have recognized and appreciated localization techniques that use acoustic signals with frequencies in an upper range of operating frequencies for a typical audio communications device. As a non-limiting example, the frequencies may be in a range of 17 kHz-20 kHz, which are outside the range of human hearing but within the range of typical consumer communication devices.

Such acoustic signals may enable accurate localization for existing communication devices, without the need for special modification. In some embodiments, if the mobile devices are smartphones, then a smartphone may simply download and install an application (App) to utilize the localization system, without necessarily requiring any special signal processing circuitry. It should be appreciated, however, that embodiments are not limited to using unmodified smartphones, as any suitable mobile device (modified or unmodified) may be used. For example, in some embodiments, if a mobile device is especially designed with hardware and/or circuitry to perform indoor localization, then such a mobile device may be used instead of, or additionally to, a smartphone. Regardless of the exact nature of the mobile device, the mobile device may be configured, via hardware and/or software, to perform localization using techniques according to some embodiments. The location resolution of such techniques may be on the order to sub-meter scales. In some embodiments, the resolution may be a few centimeters.

The location of a portable electronic device may provide context for one or more services provided through or in conjunction with the portable electronic device. Sub-meter accuracy in determining the location of a portable electronic device may allow such services to be highly focused based on activity of a user of the portable electronic device. In embodiments in which the portable electronic device is a smart phone that is likely being carried by a user, such accurate location information provides important context about what the user is currently doing or is currently interested in.

Such context information, based on sub-meter location information, may be used as part of a system that delivers services. A portable electronic device may communicate over a network with servers or other components that provide such services. In embodiments in which the portable electronic device is a smart phone, the smart phone may have communication subsystems, such as a Wi-Fi, Bluetooth or cellular data WAN subsystems. Any or all of these, or any other suitable network connection, may be used to interact with a server or other devices as part of providing location based services. In some embodiments, the server or other device may be accessible over a wide area network, such as the Internet or may be in "the Cloud." Because of the widespread use of smartphones, a system providing location based services using components, such as a voice microphone and a network connection, substantially expands the locations into which such services may be available.

In some embodiments, the localization system may be deployed in one or more regions. Each region may comprise a plurality of anchor nodes that broadcast acoustic signals, or beacon signals, in a periodic manner. In some embodiments, the anchor nodes may be coordinated by a central controller to transmit their beacon signals according to a predetermined schedule. A central controller may be provided for each region or may service one or more regions.

Mobile devices in the vicinity of a broadcasting anchor node may passively detect its beacon signal. For example, if the mobile devices are smartphones, then a smartphone may use its standard microphone to detect the beacon signals. From beacon signals from multiple anchor nodes in a region, the mobile device may determine its position. The mobile devices may passively determine position in the sense that they only receive the broadcasted beacon signals, without transmitting acoustic ranging signals to the anchor nodes.

A mobile device within a region may obtain information for use in determining its position and/or determining actions to take based on its location. Such information, for example, may be used in identifying the locations of the anchors acting as sources of acoustic information. Such information may be communicated in the acoustic beacons, in RF signals, which may be transmitted by the central controller, for example, or may be acquired over a network. In some embodiments, information may be acquired in a combination of ways. For example, information about acoustic sources within a region may be provided to allow identification of acoustic signals for the mobile device to determine its position within a region. This position information may be provided to a server, which may then provide location-based content to be rendered to a user or may identify programmed actions to be performed by the mobile device in specific locations.

The information received by a mobile device relating to the locations of anchors may have any suitable format. As a specific example, each beacon signal may reveal an identity, or other information, of the broadcasting anchor node. Upon detecting the beacon signal, a mobile device may identify the broadcasting anchor nodes. Furthermore, due to the passive receive-only nature of the mobile devices, synchronization may be performed between the mobile devices and the anchor nodes to account for possible differences in local clock times.

In some embodiments, each beacon signal may comprise a unique code. By distinguishing each anchor node's code from within the aggregate signals received over the air, a mobile device may identify the anchor nodes that are actively broadcasting. For example, each code may be uniquely distinguishable by being orthogonal or nearly-orthogonal to other codes, by any suitable technique. As a non-limiting example, pseudo-random codes (pseudocodes) may be used, although embodiments are not limited in this regard and any suitable set of uniquely distinguishable codes may be used in the beacon signals. Such coding (or other encoding of information) may allow a mobile device to determine a region in which it is located by detecting signals with the coding.

Conversely, by determining a region in which it is located, a mobile device may obtain codes for anchors broadcasting beacon signals in that region. Use of codes for anchors allows more accurate detection of the beacon signals and their time of arrival. As a result, the mobile device may receive beacon signals with sufficient accuracy to determine its position within the region to sub-meter accuracy. As an example of this approach, a mobile device may receive an acoustic or RF signal that identifies a region. Such a signal may be localized to the region, providing the mobile device with a coarse position, but without sub-meter location accuracy. Using this region information, the mobile device may access, over a network, a server or other device that provides codes for beacons in that region. By accessing codes, the detection probability of the beacons is increased, and accuracy of the determination of the time of arrival of those beacons is also significantly increased.

In some embodiments, each mobile device may have a local copy of each pseudocode. By performing a code matching process, the mobile device may correlate each locally stored pseudocode with the aggregate received signal to identify a beacon signal from each of the broadcasting anchor nodes. In some embodiments, the mobile device may also use the code matching process to perform symbol synchronization with the anchor nodes. Such synchronization, for example, may be performed by identifying timing intervals that have a high probability of aligning with timing intervals in which an anchor node is transmitting a signal with a code for that anchor.

It should be appreciated, however, that anchor node identification and symbol synchronization are not limited to using pseudocodes, and may be performed by other techniques, such as those based on detecting a leading edge, or signal start region, of a signal received on a line-of-sight path (the TOA path) among a plurality of reflected paths.

Regardless of the exact nature of the symbol synchronization technique, a mobile device that is synchronized with anchor nodes may then estimate a one-way TOA from each of the anchor nodes, which may then be used to estimate a relative distance to the anchor nodes. In some embodiments, the TOA estimation may use a threshold-comparison on the received signal strength to detect a start region of a beacon signal. The choice of threshold may be determined, for example, by to achieve a desired balance between false alarm and missed detection probabilities. In some embodiments, a further refinement of the TOA may be performed by searching within a region around the detected start region to detect TOA paths that may have been attenuated or blocked. In some embodiments, the TOA threshold may be adaptively tuned to different environments.

In some embodiments, one or more signal processing techniques may be used instead of or in addition to use of codes, to increase the accuracy with which beacon signals are detected and/or their time of arrival is determined. For example, in some scenarios, particularly in an indoor environment, acoustic signals may reflect from one or more surfaces before reaching a mobile device. As a result, multiple copies of a beacon may be received, shifted in time as a result of longer delays along longer paths involving reflections. Signal processing techniques may use this multipath information to increase the reliability of a determination that a beacon was detected. Alternatively or additionally, signal processing may be used to select a path along the line of sight between an anchor and a mobile device. Identifying such a path may increase the accuracy of a determination of position of the mobile device. As yet another example, signal processing may be used to identify a scenario in which, though a beacon is detected, there is no line of sight path between the anchor and the mobile device, such that that beacon should not be used in determining the position of the mobile device. Examples of such signal processing techniques are described below.

Upon determining the TOA of signals from the anchor nodes, a localization system may be used to determine the absolute location of the mobile device. A one-way ranging process may be used, such that each mobile device can determine its location passively based on the received beacon signals. In some embodiments, each mobile device may estimate its location based on estimated one-way TOA from the anchor nodes, and also based on the known locations of the anchor nodes. The mobile device may have knowledge of the locations of the anchor nodes, for example, by accessing a database of anchor node locations, or by downloading their locations via the App, based on information in the beacons, or by any other suitable technique, as embodiments are not limited in this regard.

The location of the mobile device may be determined as an absolute or relative location. If, for example, the absolute locations of the anchors is known with respect to some coordinate system (such as latitude and longitude), the determined location may be expressed in the same coordinate system. Though, a relative location may be determined with respect to the region or with respect to one of the anchors or other reference point, such as the controller, within the region.

Regardless of how the location is to be expressed, the location may be determined from the relative time of arrival information for the signals from each of the available beacons. Because the anchors are synchronized via the central controller, a difference in propagation time can be computed from the time of arrival of the beacons from different anchors. The difference in propagation time can be related to a difference in distance. It will be appreciated that the various pieces of information, including the locations or relative locations of the anchors and differences in distance, can be the basis of a multivariate problem that can be solved, with or without assumptions, to yield an indication of the location of the mobile device.

In some embodiments, the localization system may utilize an incremental distance update technique. For example, the pseudocodes transmitted by the anchors may comprise multiple symbols. The anchor nodes may be coordinated such that each broadcasts one symbol (or more) from its pseudocode, in a round-robin manner. After all the anchor nodes are done transmitting its symbol(s), the first anchor node of the group transmits its next symbol(s) to begin another round of transmissions. Therefore, in each group of transmissions, a mobile device may receive new information from some of the anchor nodes. The distance may be estimated from the first set of symbols received. The new information may be used to update the distance and the mobile device's position in a real-time manner, without having to wait for, and process, entire pseudocode sequences from all of the anchor nodes.

In some instances, a mobile device may be unable to receive information from some anchor nodes, due to their beacon signal being temporarily blocked or deeply faded. This may occur, for instance, as the mobile device is being moved to different locations. The real-time update techniques may be configured to mitigate such problems by using a sliding averaging window that computes and average of a past window of TOA measurements to determine the current TOA measurement. Such update may enable movements of a user of the mobile device to be accurately tracked in real-time, despite occasional fading or blockage of signals from some of the anchor nodes.

The inventors have recognized and appreciated that achieving accurate sub-meter resolutions in location tracking using low-complexity techniques that leverage existing technology (such as smart phones) and are scalable to many users could fundamentally change and improve the way that current location-based services are delivered. Such techniques may provide lower complexity and cost than full-digital coherent IR-UWB systems, which typically require a bandwidth of several GHz to achieve sub-meter ranging accuracy, increasing the overall hardware cost and processing power dramatically. Furthermore, acoustic techniques that use ultrasound frequencies typically require dedicated devices that are especially configured to operate in the ultrasound regime, as well as to perform synchronization for inter-node ranging. Such requirements for using dedicated devices impedes its wide-spread adoption by ordinary users.

The inventors have recognized and appreciated that pervasive consumer mobile devices, such as smartphones, offer new opportunities for relative indoor localization. In some embodiments, a Time-of-Arrival (TOA) estimation and communication scheme may utilize the voice microphone of a user's mobile device to achieve accurate ranging. In some embodiments, the pre-placed anchor nodes providing the ranging beacon signals may also be implemented with low cost and complexity, such as with a small speaker and a microcontroller. The inventors have recognized and appreciated that the simplicity of the anchor nodes and mobile devices may nonetheless provide accurate localization by using a TOA estimation method and real-time position updating that achieves robust and accurate ranging results.

Such a localization system may be used in a broader system to deliver information to a user of a mobile device. For example, localization may be used to provide location-based notification, indoor navigation, target tracking, and an indoor virtual guider. Fine-grained indoor position allows current building-level or room-level check-in services to be fine-tuned to foot-level. When used to provide geo-tagging information, such information will be accurate enough for labeling objects in 3D centimeter-level, which can be applied, for example, for location-based alternate reality game (ARG). Such an approach may also be used to enable fine-grained indoor navigation that guides a user of a mobile device to specific rooms inside building, and even to some particular exhibitions or shelves within museum or store. In commercial services, indoor position may be applied by shopping mall managers, factory bosses and hospital doctors to monitor the flow of product, equipment and inventory movement. Additionally, low-complexity and inexpensive anchors may be used for the service providers; no additional special devices required for the users could ease the popularity of the technique.

As an example, in a shopping mall equipped with this system, customers with preplanned shopping lists may purchase all their needs with minimum efforts by following the recommended shopping path provided in an App executing on a smart phone. Such an app may communicate with a server with a database of product information for a store. A user may provide input about products to purchase. All of the required products could be pinpointed in the shelf within the same indoor coordinate system as the smartphone, allowing the smart phone, or other device communicating with the smart phone, to generate location information comprising directions for the user to navigate from the user's present location to a next item to purchase. As another example of a use of such a system, the system may provide customers information about nearby products in their smartphones without any intentional typing or keyword searching. Such a system may also provide, on behalf of advertisers, information on relevant products or coupons by inferring the interests of customers based on their visiting/shopping behaviors.

Shopping malls, museums, airports, hospitals, exhibitions, conferences, and libraries may also benefit from low-complexity and scalable localization techniques. They could significantly improve their current services and create a new economic growth point. By providing indoor location-based services (LBS) and navigation, these service providers could be more competitive than peers. Smartphone or smartphone operating system providers could provide the indoor LBS and navigation as a built-in application and in turn stimulate their sales growth.

Additional details of exemplary embodiments of components of such a system are provided in connection with the figures. FIGS. 1, 2, and 3 illustrate examples of a central controller, an anchor node, and an indoor localization scenario, according to some embodiments. In FIG. 1, a central controller 100 may comprise a timer 101 that maintains a local clock to coordinate the anchor nodes (e.g., anchor node 120 in FIG. 2). The coordination may be performed by a microprocessor 102, which may execute one or more algorithms stored locally in a data store that indicate, based on the output of timer 101, what control signals to transmit and when. Microprocessor 102 may control RF module 103 to communicate coordination instructions to anchor nodes, via an antenna 104. While using RF may enable low-delay communication, it should be appreciated that embodiments are not limited in this regard, as any suitable transmission frequencies or mechanism may be used to communicate between the controller 100 and anchor nodes.

FIG. 2 illustrates an example of an anchor node 120. In some embodiments, the anchor node 120 may have an antenna 121 and an RF module 122 for receiving coordination instructions from a central controller (e.g., controller 100 in FIG. 1). These coordination instructions may include information about times of transmission, which could be in the form of periodic commands addressed to a specific anchor node to transmit or timing sequences from which each anchor node may determine its time to transmit. Alternatively or additionally, the coordination instructions may include a code for the anchor node to use when transmitting. The anchor node 120 may comprise a microprocessor 123 for processing the coordination instructions and executing one or more algorithms for transmitting acoustic beacon signals to mobile devices. The beacon signals may be transmitted using an acoustic module 124, via an electroacoustic transducer, such as loudspeaker 125.

FIG. 3 illustrates an example of an indoor localization scenario, in which mobile devices 130 receive acoustic beacon signals from anchors 120 that are coordinated by a controller 100. FIG. 3 may illustrate just one region in which a localization system may operate. A system may comprise multiple regions, which may be dispersed over a wide area, including possibly throughout a building, a cluster of buildings, a neighborhood, a city, or broader geographic area. Each region may have any suitable dimensions and may have more than four anchors. In some embodiments, the number of anchors may depend on the size and acoustic characteristics of the region, and the number and locations of beacons may be selected to provide a high probability that a mobile device at any location within the region will receive at least four beacons. Accordingly, larger or noisier regions may have more beacons.

In some embodiments, the boundaries of a region may be determined by the venue in which the region is located. For example, a region may be a room, a hall, an exhibit space or other suitable bounded region in a building. Though, it is not a requirement that a region be bounded by walls.

In some embodiments, the controller 100 transmits RF signals 131 to the anchors 120. The RF signals 131 may comprise coordination commands that provides the anchors 120 with a particular schedule according to which to transmit their beacon signals, for example using a round-robin schedule. The anchor nodes 120 transmit their beacon signals, according to the instructed schedule, using acoustic signals 132 which are passively detected by microphones 133 in the mobile devices 130.

FIG. 4 is a functional block diagram illustrating one possible embodiment of processing and communication within and between a controller (e.g., controller 100 in FIG. 3) and an anchor node (e.g., anchor node 120 in FIG. 3). In block 140, a timer in the controller may generate a local reference clock that may be used to coordinate the anchor nodes. In block 141, the controller's RF module may transmit an RF signal comprising coordinating instructions to the anchor, via an RF transmission 142. At the anchor, the RF signal is received in block 143 by an RF module, and the anchor node demodulates the RF signal in block 144, using any suitable demodulation technique, as is known in the art, to obtain coordination instructions.

In block 145, the anchor node may check for the presence of a token, for example in the coordination instructions sent in the RF transmission in 142. Each token may be directed to an anchor node, signifying that the anchor node is to transmit a beacon. In some embodiments, the token alternatively or additionally may be used by the anchor node to determine a unique pseudocode ID in step 146. The anchor may use the pseudocode ID to determine a pseudocode sequence that the anchor node will broadcast to the mobile devices in its beacon signal. The pseudocode sequence may be stored locally on the anchor node, may be accessed from a remote data store, or may be provided by the controller along with the token. It should be appreciated that embodiments are not limited to any particular manner in which the anchor node obtains the pseudocode sequence.

In step 147, the anchor node may modulate a carrier signal with the pseudocode sequence, using any suitable form of modulation. The modulation may involve, as non-limiting examples, amplitude, frequency, phase, or any combination thereof. In some embodiments, in step 148, pulse shaping may be performed to shape a pulse transmitted in the beacon signal. Pulse shaping may be performed for a number of reasons, including but not limited to, narrowing the pulse in the time domain, limiting the bandwidth of the pulse, or reducing inter-symbol interference. As a non-limiting example, the modulation and shaping may use multi-resolution methods, such wavelets to represent information in the beacon signal.

In some embodiments, the modulated carrier and shaped pulses may have a frequency bandwidth that is an upper range of acoustic frequencies detectable by typical consumer mobile devices. For example, the frequency bandwidth may be between 1 kHz and 22 kHz. In some embodiments, the frequency bandwidth may be between 10 kHz and 22 kHz. As a specific example, the frequency bandwidth may be between 17 kHz and 20 kHz. Regardless of the exact frequency, the modulated and possibly shaped acoustic beacon signal may be transmitted via a speaker in step 149.

As used herein, a frequency bandwidth of a signal indicates a range of frequencies that encompasses a substantial portion of the energy of the signal. Any suitable metric may be used to determine the bandwidth of a signal. The specific metric that is appropriate may vary based on characteristics of the signal. For example, the bandwidth may capture 90% of the energy of the signal or may be determined based on the frequencies where the amplitude of the signal drops by 3 dB from its peak or average value. However, one of skill in the art will recognize the frequency bandwidth of a signal.

FIG. 5 is a functional block diagram illustrating an example of one possible embodiment of processing steps that may be performed by a mobile device 130, such as a smartphone or a special-purpose mobile device with circuitry configured to implement indoor localization techniques, according to some embodiments. In some embodiments, if the mobile device 130 is a smartphone, then the mobile device may have a software application (an app) that performs various functions in block 150 and/or any of blocks 151-158. The app may be obtained by any suitable means, such as being downloaded from a server or transferred from a local computer, as embodiments are not limited in how the app is acquired by the mobile device. It should be appreciated, however, that some or all of the processing steps in FIG. 5 may be implemented by any suitable mobile device, not necessarily limited to a smartphone with a downloaded app. For example, mobile device 130 may be a special-purpose device configured with an integrated circuit (IC) chip or other suitable hardware to implement blocks 150-158.

In block 150 the app may control the mobile device 130 to perform processing on an acoustic beacon signal received at microphone 133 and/or may control the mobile device to communicate over a network with a server or other device. In some embodiments, such processing may comprise queuing the audio beacon signal in block 151, and performing pre-processing in block 152 to filter and detect the beacon signal. In block 153, the mobile device may perform various ranging functions to determine a relative distance to a broadcasting anchor node. Based on these ranging results, the mobile device may perform computations in block 154.

The pre-processing in block 152 may comprise frame-based adaptive filtering in block 155 and multi-resolution analysis in block 156. Signal detection may be performed to detect and extract the embedded beacon signal. If no beacon signal detected, the mobile device may continue waiting until the beacon signal is detected. The detection result may be a digital symbol "0" to represents the signal absent, or "1" to represent the signal present. In some embodiments, the multi-resolution analysis in block 156 may be based on wavelet transformations.

The ranging in block 153 may comprise symbol synchronization in block 157 and TOA estimation in block 158. In some embodiments, the synchronization 157 may be based on Code Matching, which matches the demodulated digital symbol to determine where the signal comes from, i.e., determine the signal source ID. In some embodiments, an anchor position may be determined by transforming the source ID to its predefined location coordinate values. The TOA Estimation 158 may perform ranging by measuring the arrival time of the signal.

In some embodiments, accurate localization may be achieved without the need for two-way synchronization between the mobile devices and the anchor nodes by performing code matching and iterative relative distance measurements. Code matching may be used to determine both an identity and a symbol synchronization time of an anchor node. Once synchronized, the mobile device may collect a sufficiently large number of TOA measurements from each of the anchor nodes, and performing distance updates to incrementally improve the distance estimates with each collected TOA measurement. Based on these aggregated and updated relative distances, or pseudo-ranges, between the anchor nodes and the mobile devices, a localization algorithm determines an estimate of the true distance to each anchor node.

Symbol Detection and Demodulation

To detect the signal and demodulate the information bit in r(k), all the multi-paths $\xi_j$ contribute to the signal region and can be utilized to extract $p_{c(j)}(a(j), b(j))$. Thus, the detection problem can be written as to detect the signal present or not in the j-th symbol in $$r_j(k) = \overline{A} g_j(k) + n_j(k) \tag{1}$$

Where $\overline{A}$ is the average signal energy over $\xi_j$ multi-paths, $g_j(k)$ is the received pulse in the j-th period of g(k). If $\overline{A} > \gamma$, the signal can be declared as present and $\hat{p}_{c(j)}(a(j),b(j))$ will be set to '1', otherwise $\hat{p}_{c(j)}(a(j),b(j))=0$, where $c = \lfloor j/(ML) \rfloor$. $\hat{p}_{c(j)}(a(j),b(j))$ is one estimated version of p(a(j), b(j)), and c is one round measurement.

TOA Estimation

After detected the symbols, more detailed time-of-arrival (TOA) estimation should be performed to estimate the first path sample $k_j^0$ in the whole symbol durations. The TOA estimation provides ranging information that needed in localization, and its accuracy directly affects the overall position resolution. The TOA estimation problem can be written as to detect $k_j^0$ in j-th symbol, and represent as $$r_j(k) = \overline{A}_0 g_j(k - k_j^0) + \sqrt{\varepsilon} \sum_{i=1}^{\varepsilon_j - 1} A_j^i g_j(k - k_j^i) + n_j(k) \quad (2)$$

where $\overline{A}_0 = \sqrt{\varepsilon} A_j^0$ is the amplitude of the TOA path signal. The problem of TOA estimation can be modeled as $$k_j^0 = \min_k (k \mid r_j(k) > \eta_{TOA}), k \in [0, N_k] \quad (3)$$

where $k_j^0$ is only available when the detected symbol in j-th period is '1'.

The technique of dynamically changing the TOA estimation threshold to balance between the false alarm and miss detection by maximizing TOA Detection Probability is addressed in Appendix A, in the context of an alternative technique signal modeling and symbol synchronization.

Symbol Synchronization and Code Matching

In the receiver side, the estimated version of the transmitted beacon sequence is $\hat{p}_{c(j)}(a(j), b(j))$. If the signal is declared as present, $\hat{p}_{c(j)}(a(j), b(j)) = 1$, otherwise $\hat{p}_{c(j)}(a(j), b(j)) = 0$. Perform code matching between predefined pseudocode $p_{m,i}$ and estimated information bits $\hat{p}_{c(j)}(a(j), b(j))$, the m-th anchor node can be identified. When total ML length symbols have been received, the code matching process can be utilized to synchronize between the anchor node and mobile phone by $$[\Delta_a, \Delta_b] = \underset{\Delta_a, \Delta_b}{\operatorname{argmin}} \left\| \hat{p}_{c(j)}(a(\hat{j}) + \Delta_a, b(\hat{j}) + \Delta_b) - p_{m,i} \right\|_1 < d_{tol} \quad (4)$$

where the beacon period index $j \in [j_0, j_0 + ML]$, $j_0 = c(j) \times (ML)$ is the starting index of the symbol sequence, ML is the total length of symbols that used to perform (4), $\hat{j} = j - j_0$. $c(j)$ can be used to illustrate the index number of code matching. $a(j) + \Delta_a$ and $b(j) + \Delta_b$ is the cyclic shifting in $\hat{p}_{c(j)}(\bullet)$.

With the offsets $\Delta_a$ and $\Delta_b$ available for the anchor node index and pseudocode sequence index, the mobile phone can aware the anchor node index ($\hat{m}$) and sequence index ($\hat{i}$) of the current received symbol j as $$\hat{m} = [(j - j_0) \bmod M] + \Delta_a$$

$$\hat{i} = [(j - j_0) \bmod L] + \Delta_b \quad (5)$$

where $j_0 = \lfloor j/ML \rfloor \times (ML)$.

After the synchronization, the obtained $\hat{m}$ and $\hat{i}$ in (5) may be used to determine a relative distance between the mobile device and the broadcasting anchor node. While the relative distances are not limited to being computed by any particular device, in some embodiments, the relative distance determination may be performed by a remote server, as described below in connection with FIG. 6.

After the mobile device completes the synchronization, in some embodiments, in step 159, the app 150 may communicate information with another computing device, such as a remote server. The information may comprise, for example, TOA estimations and/or relative distances determined from the ranging in block 153.

FIG. 6 is a functional block diagram of an example of one possible embodiment of processing performed by indoor location-based-services (LBS) on a remote server (e.g., a server that communicates with the mobile app 150 in step 159 of FIG. 5). It should be appreciated, however, that one or more of the processes described in FIG. 6 may be implemented on the mobile device itself (e.g., mobile device 130 in FIG. 3). For example, in some embodiments, the LBS application may be implemented on the mobile device, and may communicate distance and anchor ID information to a remote server. Regardless of where the various processes in FIG. 6 are implemented, such processing may provide location-based-services with accurate information about the location and real-time movement of a mobile device.

In block 160, various indoor location-based services may be implemented by the server. In some embodiments, an LBS may acquire TOA measurements and/or relative distance measurements from a mobile device, estimate the actual location of the mobile device, and push information to the mobile device based on its location. The pushed information may include any information suitable for the LBS, such as advertisements in a store, medical information in a hospital, data in a factory, educational information in a museum, as non-limiting examples. The pushed information may be content for display on the mobile device or commands to invoke applications or other programmed functions.

In step 161, the server may perform distance and ID collection based on the measurements received from the mobile device app (e.g., app 150 in FIG. 5). In some embodiments, the collected information may be, for each mobile device, an indication of an identifier of each of a plurality of anchors from which the device has received beacons and the relative distance to each, determined based on acoustic signal processing on the device. Though, in some embodiments, less processed signals may be transmitted from the mobile device such that some or all of the acoustic signal processing device may be performed on the server. In such an embodiment, Relative Distance accumulates all the distance from different anchor node until sufficient number of measurements available for localization.

The distance measurements may be used in block 162 to perform distance error mitigation. Such processing may disambiguate position, or perform other processing. In some embodiments, when some acoustic signal processing is performed on the server, this may include non-line-of-sight (NLOS) Mitigation to mitigate effects of having no direct line-of-sight signal, by extracting and evaluating the signal feature to improve the overall ranging robustness. An example of such techniques are described in more detail below. Though, in other embodiments, such processing may be performed on the mobile device.

In block 163, the ID of the anchor whose beacon signal was detected by the mobile device is determined and in step 164, a database is accessed to determine the exact location of the broadcasting anchor. This anchor location information, along with the error-mitigated distance and/or TOA measurements from block 162, are sent to a localization process 165, in which the location of the mobile device is estimated. The anchor location is also sent to an indoor MAP process 166, which may provide various map-based functionality, such as navigation or tracking, for the mobile device.

Localization 165 performs location calculation by using the measured distance pairs and available anchor positions. One example of a localization process 165 is described in more detail below. In some embodiments, the localization may be accurate to a few centimeters. For example, in some embodiments, the accuracy may be less than 100 cm. As another example, in some embodiments, the accuracy may be less than 30 cm. As a specific example, in some embodiments, the accuracy may be less than 10 cm.

In step 167, tracking and navigation may be performed to estimate the real-time location of the mobile device and, in some embodiments, to provide navigation. The location estimation of the mobile device may be updated incrementally based on real-time updates from the app 150 regarding TOA and/or distance measurements, which may be continuously collected in step 161.

Based on this real-time location information, the LBS in the server may push relevant information to the mobile device app 150 in step 168.

Distance Update

The distance update may be performed on the mobile device, server or other suitable device. After the mobile device has performed symbol synchronization, and obtained $\hat{m}$ and $\hat{i}$ in (5), then every M symbols can obtain one distance measurement group with the same pseudo sequence index $\hat{i}$. Such group of measurements is the minimum tuple of ranging for one position update, and every measurement in such a group is from different anchor nodes. For j-th symbol, the index of group measurement is $j_g = \lfloor j/M \rfloor$ with each element represents the TOA value obtained in (3). Denote the TOA estimation matrix as $r = r_{m,jg}$, m=[1,M]. For notation convenience, one group of measurements from all anchor nodes can be represented as $r_g = r_{m,jg}$, where $j_g$ is a fixed value, $r_g$ is a measurement vector.

Due to some symbol-miss, the TOA value is not fully available for all M anchor nodes in one round time, i.e., obtained ranging value $r_g$ is a sparse vector. To improve the reliability of ranging results, we perform sliding window to the TOA estimation matrix r with length of W, and obtain a new version of $r_g$. The rationale of the sliding window is to use the historical data to represent current sparse measurement. However, different symbol index corresponds to its own starting index of the TOA measurement, e.g., the TOA value in j-th symbol is larger than (j−1)-st TOA value by $N_k$. Thus, for the extracted length of W and width of M matrix, i.e., the latest W column of the matrix r, $r_g = [r_g(m)]$ can be calculated by $$r_g(m) = \frac{1}{N_{eff}(m)} \sum_{\Delta_g=0}^{W-1} \left[ r_{m,(j_g - \Delta_g)} + \Delta_g \times N_k \right], \quad (6)$$

If $r_{m,(j_g - \Delta_g)}$ is available where $N_{eff}(m)$ is the total number of effective measurement available in the W length matrix r, m represents the m-th row. Thus, vector $r_g(m)$ can be used as the current distance measurement, with each TOA value indicate the distance from the m-th anchor to the mobile phone.

In some embodiments, the microphone in the mobile phone only receives beacons broadcasted by the anchor nodes passively. Such one-way ranging process outperforms the two-way ranging in turns of complexity and user capacity. The drawback is that two-way synchronization cannot be realized; the obtained ranging results $r_g(m)$ by such one-way ranging are pseudo-ranges with unknown starting point. The measured pseudo-ranges between the anchor nodes to the mobile phone is $\hat{r}_m = C \times r_g(m)$, where C the speed of the aerial acoustic signal. Denote the true distances are $r_m$, m=[1, ..., M], the unknown starting point is $\delta_r$, $\hat{r}_m$ can be written as $$\hat{r}_m = r_m + \delta_r + n_m \quad (7)$$

where $n_m$ is the distance measurement noise for $\hat{r}_m$. For simplicity, we assume $n_m$ is a i.i.d. Gaussian random variable with noise variance of $\sigma^2_m$.

Error Pruning Techniques

With the restraint of low transmission power, sound noises, blockage and attenuation of the indoor channel, error pruning techniques are essential for the regular operation of the indoor localization system. The source of potential errors could be classified into two categorizes:

1) signal interference due to the high band sound noises;
2) Blockage and indoor Non-light-of-sight (NLOS) situations.

To deal with the signal interference issues, some embodiments may perform spread spectrum in transmission and correlation processing in the receiver to obtain noise resistance.

Compared with the noise, indoor complex environment with blockage and high-dense multi-paths is more challenge. The blocked localization beacon could either be attenuated or introduces additional delay that prolonged the obtained ranging distance, we called it NLOS bias effects. Using these problematic ranging input could cause over-fitting in localization calculation, or even make the final results diverge. Thus, identifying and mitigating these prolonged or problematic ranging measurement may improve localization.

NLOS Identification and Mitigation

Other than energy-based ranging approaches, e.g., using RSS of WiFi, GSM or Bluetooth, that obtains the energy value in the packet level. Using longer accumulation time with the length of several packet is necessary to achieve better energy estimation. However, the short duration channel information will be completely lost, and current WiFi, GSM and Bluetooth protocol does not expose the radio channel condition to the users.

In some embodiments, using an acoustic signal for ranging provides as an advantage high timing resolution and full access to acoustic channel information. Extract features from estimated channel condition, the goodness of transmission could be evaluated. For example, if the delay spread of the estimated channel is significant larger than normal conditions, the ranging results from this channel may have high probability of blockage, i.e., NLOS condition. By lowering the weighting efficient of this ranging measurement during localization, overall location result could be robust to harsh environments.

In some embodiments, we perform threshold-based delay spread and clustering calculation approach to identify the NLOS situation, the process can be written as $$h_j^{NLOS} = \left( \sum_k \tau_k^{toB} > \eta_{NLOS} \right), k \in [0, N_k] \quad (8)$$

where $\tau_k^{toa}$ is the toa delay of all the sampling points that crossed the detection threshold.

FIG. 7 illustrates an example of one possible embodiment of a coordinated transmission timeline 700 for anchor nodes broadcasting beacon signals to mobile devices. The transmission is broken up into groups of M slots, and one slot may be assigned to each anchor node. In FIG. 7, three groups are shown for illustrative purposes, groups 702a, 702b, and 702c. It should be appreciated, however, that the number of groups is not limiting. In each group, an anchor node transmits one symbol of its unique pseudocode. For pseudocodes of length L, all anchor nodes will transmit their entire pseudocodes after ML slots.

In some embodiments, though a mobile device does not have access to a timing information defining the timing slots by the controller, by symbol synchronization with respect to multiple anchor nodes, the device may determine the skew with respect to other nodes with which it is receiving symbols from each node—providing sufficient information to determine relative distances to each of the nodes.

As an example, the transmission of one anchor node is shown in FIG. 7. In group 702a the anchor node transmits a symbol in the fourth slot, shown in this example as a positive bit, in symbol 704a. In group 702b, the anchor transmits a second bit, shown in this example as a negative bit in symbol 704b, again the fourth slot. In group 702c, the anchor node transmits the third bit of its pseudocode, shown as a negative bit in symbol 704c.

While the exemplary strategy shown in FIG. 7 allows fast collection of new symbols from each anchor node, it should be appreciated that coordinated transmission strategies are not limited to the example of FIG. 7. For example, each anchor node may transmit more than one symbol in a group. This may enable more information to be updated at per group, at the cost of longer delay to update. Another example of a coordinated strategy may be that each anchor node transmits its entire pseudocode before the next anchor node transmits. An example of such an approach is described in Appendix A.

Figure 8:
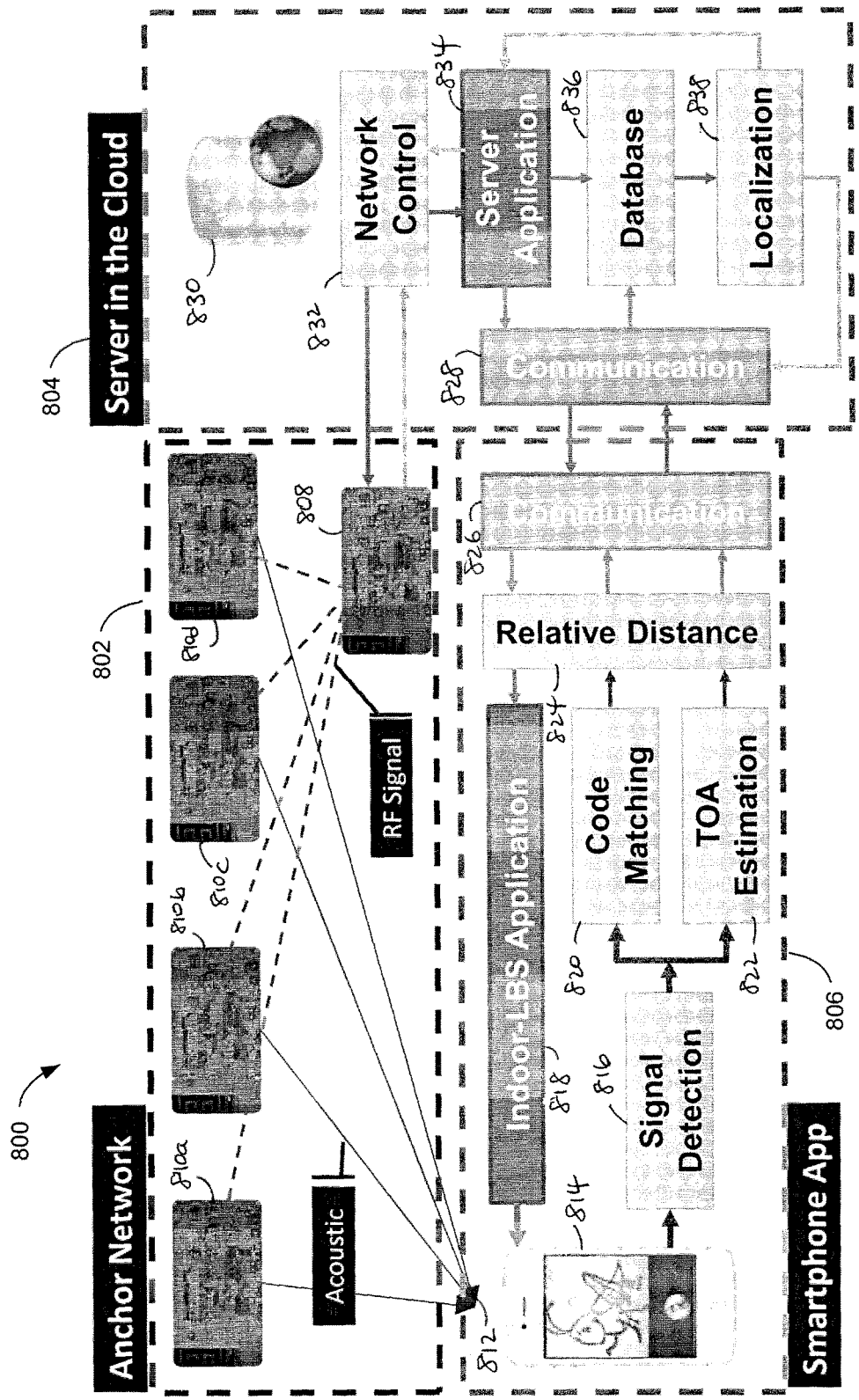
FIG. 8 is a schematic illustration of a localization system implementing indoor location-based-services, in accordance with some embodiments.

FIG. 8 illustrates a simplified example of one possible embodiment of an integrated architecture of an audible-band acoustic localization system 800. Although the example of FIG. 8 illustrates indoor localization being performed with a smartphone, it should be appreciated that embodiments are not limited to using smartphones, as any suitable mobile device may be used. For example, in some embodiments, the mobile device may be a special-purpose device configured to perform indoor localization.

The system 800 illustrated in FIG. 8 comprises a network 802 of anchors (e.g., anchors 120 in FIG. 2) and a central controller (e.g., controller 100 in FIG. 1), a server 802 located on a network (e.g., a server implementing the flowchart of FIG. 6), and a mobile device app 806 (e.g. app 150 of FIG. 5), which may be implemented on a mobile device, such as a smartphone. It should be appreciated, however, that embodiments are not necessarily limited to using a mobile device app 806, as the functionality of the mobile device app 806 may also be implemented in hardware using special-purpose circuitry.

Regardless of the exact nature of implementing the mobile device app 806, the mobile device may interact with the anchor network to collect position information. The mobile device may communicate this position information to the server in the cloud. In response, the server in the cloud may send information based on this location, specifying, for example, location based content or location based actions.

The anchor network 802 may comprise a central controller 808 that is communicative with any suitable number of anchors, such as 810a, 810b, 810c, and 810d, although the embodiments are not limited to any particular number of anchors, and the number of anchors may change dynamically with time. The communication between controller 808 and anchors 810a through 810d may be performed by a suitable medium, such as a wired cable or wireless.

The anchors 810a through 810d may be coordinated to broadcast acoustic beacon signals, some or all of which may be detected by a microphone 812 of a mobile device 814. At any point in time, the number of anchor nodes for which beacon signals are detected by the mobile device 814 may depend on various factors, such as obstacles, noise or other interference. The smartphone app 806 may be able to compensate for such dynamic interference by various mitigation techniques, such as sliding window averaging and NLOS mitigation, as described above. The results of processing performed by signal detection 816, code matching 820, and TOA estimation may be used by relative distance module 824 to determine relative distances, or pseudoranges, from the mobile device 814 to one of the broadcasting anchor nodes, 810a-810d.

The smartphone app 806 may also comprise an indoor-LBS application 818, which may implement a number of possible LBS functionality that provide a user of the mobile device 814 with information and/or services related to the user's tracked location. It should be appreciated, however, that the LBS application, in part or in whole, may be implemented in other computing devices that are communicative with the mobile device 814, such as server 804. It should be appreciated, however, that the smartphone app 806 may communicate its determined relative distance estimations with any suitable computing device.

In the non-limiting example of FIG. 8, the smartphone app 806 is communicative with a remote server 804 via communication module 826. This communication may take place via any suitable transmission technique, such as wireless or wired cable. Regardless of the exact nature of the communication module 826 at the mobile device 814 and the corresponding communication module 828 at the remote server 804, the smartphone app 806 may communicate relative distance estimations to the server 804. The server 804 may have access to a data store 830, which may be a data memory located in the server 804, or may be local area network or a wide area network, such as the Internet, to which the server 804 is connected.

In some embodiments, a network control module 832 may configure and/or control the anchor network 802. As non-limiting examples, the network control module 832 may obtain location information about the anchor nodes 810a-810d to provide navigation services to the mobile device 814, or may instruct the central controller 808 to issue particular commands to the anchor nodes 810a-810d. For example, the network control module 832 may designate a special anchor node to adapt its transmission technique to more sensitively determine the presence of nearby users. The special anchor node may, for example, correspond to a location that is deemed particularly important for any suitable reason, whether commercial, safety, or otherwise. The designated anchor node may then utilize more transmission power and/or more complex pseudocode sequences, in order to enable mobile devices to more accurately detect its beacon signal.

Particular regions may be identified and the network control module 832 may enable the anchor network 802 and/or smartphone app 806 to perform particular functions when the mobile device 814 is located at those regions.

Regardless of the specific nature of the network control module 832, it may be communicative with a server application 834. The server application 834 may access a local database 846 and may also transmit information to the smartphone app 806 via the communication module 828. The database 836 (e.g., database 164 of FIG. 6) may store information related to locations of mobile devices, locations of anchor nodes, data to push to the smartphone app 806, and/or other information that may be relevant to location-based-services.

A localization module 838 may implement one or more localization algorithms (e.g., localization process 165 of FIG. 6) to estimate a location of the mobile device 814, based on relative distance information. Such location information may be transmitted to the LBS application 818, and/or may be used by the server application 834.

Figure 9:
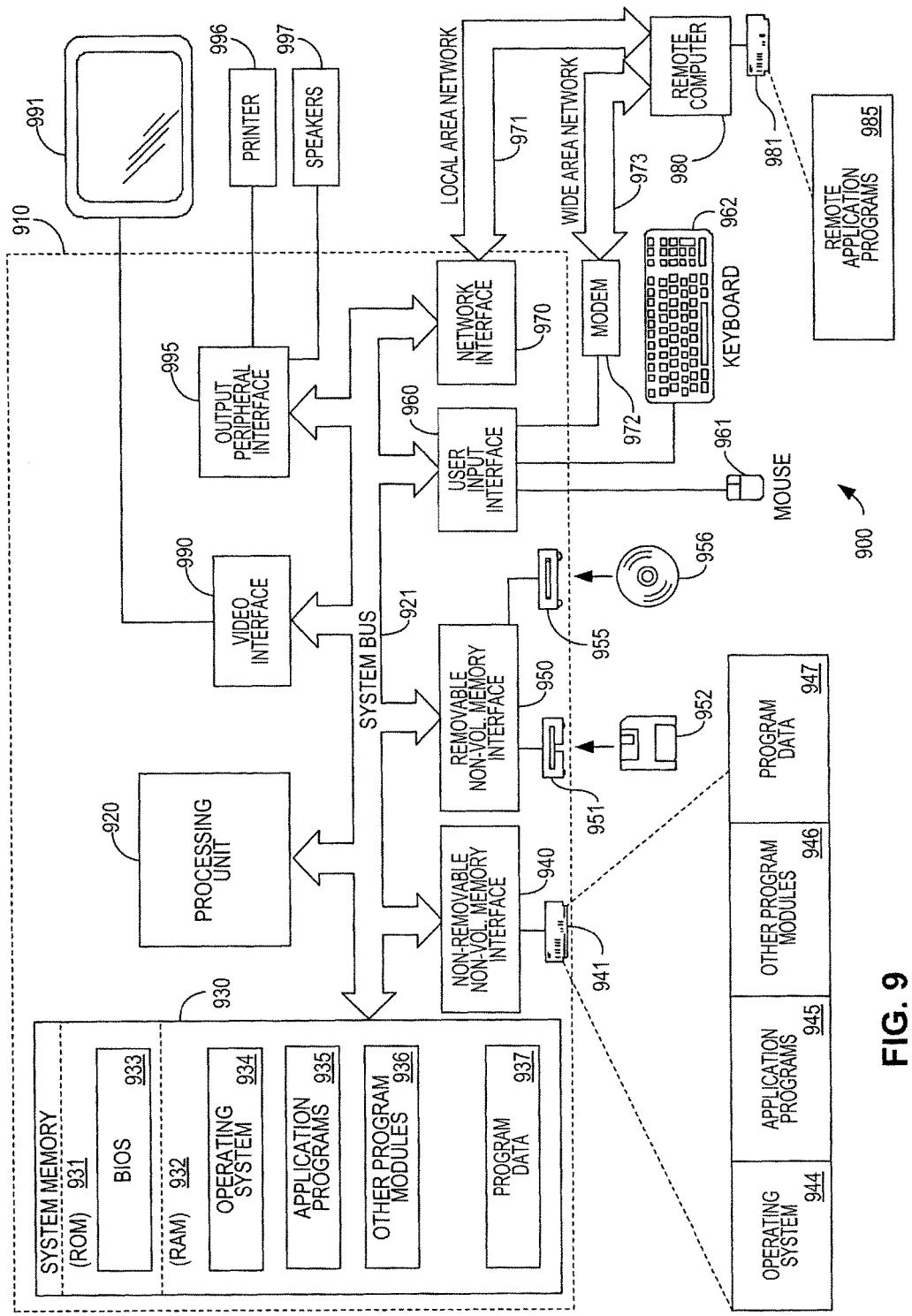
FIG. 9 is an exemplary computer system on which some embodiments of the invention may be implemented.

FIG. 9 illustrates an example of a suitable computing system environment 900 on which the invention may be implemented. This computing system may be representative of a central controller (e.g., central controller 100 of FIG. 1), an anchor node (e.g., anchor node 120 of FIG. 2), a mobile device (e.g., mobile device 130 of FIG. 3) or a server (e.g., server 804 of FIG. 8). However, it should be appreciated that the computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

APPENDIX A

Described below are examples of signaling, anchor node scheduling, symbol synchronization, and TOA estimation. In some embodiments, some or all of the techniques described below may be used in addition or as an alternative to the techniques described in the foregoing.

Transmit and Receive Signal Modeling

In some embodiments, the operating signal in the localization system is the acoustic signal that should be received and processed by a normal microphone to lower the hardware requirement. However, the acoustic signal band of the microphone may be limited, falling in the audible range (200 Hz-20 KHz) of humans. To reduce interference between beacon signals and daily environmental noises, in some embodiments, a high frequency side of 17 KHz-20 KHz may be used as the operating band since human ears are insensitive to such high frequency sound.

The transmitted acoustic beacon signal from the anchor node can be modeled as $$g_t(t) = \sqrt{\epsilon} \sum_{j=0}^{N_p-1} \sum_{i=0}^{N_s-1} g_{i,j}(t - jT_p - iT_s) \quad (9)$$

where $g_{i,j}(t)$ is the transmitted signal with i, j denote the ith symbol in jth beacon period, $\epsilon$ is the signal energy. $T_p$ is the beacon period with the beacon number of $N_p$; $T_s$ is the symbol durations with $N_s$ symbol numbers. In some embodiments, free-space may be provided in beacon periods to mitigate inter-beacon interference, i.e., Ns×Ts<Tp. The value of each information bit is $b_i=\pm 1$ and may be repeated for every period. $b_i$ may be transmitted by $g_{i,j}(t)$ using binary frequency modulation (BFSK) in f1 and f0 frequency point for symbol '1' and '0', respectively, though it should be appreciated that other suitable modulation techniques may be used.

The acoustic beacon signal is captured by the microphone and converted to the electrical domain after propagation through the free space with distortion. Passing through the analog-to-digital convertor (ADC), the received signal may be digitalized as r(k) with sampling frequency Fs, and k∈[1, . . . , Nk], where Nk=Ts×Fs. The digital version of the transmitted signal is $g_{i,j}(k)$; every symbol contains Nk sampling points. The digital result that is $$r_{i,j}(k) = \sum_{l=0}^{\xi_{i,j}-1} A_{i,j}^l \cdot g_t(k - k_{i,j}^l) + n_{i,j}(k) \quad (10)$$

where $\xi_{i,j}$ is the total number of propagation paths, and Al i,j, kl i,j=τl i,j×Fs represents the digital version of the multi-path delay. The term ni,j(t) may be modeled as independent white Gaussian noise in the ith symbol of jth period, though any suitable model of noise may be assumed, as embodiments are not limited in this regard. Nb=Tp×Fs means the number of sampling points in one beacon period.

Symbol Synchronization and TOA Estimation

If non-identical clocks are used in the transmitter/receiver pair, then symbol synchronization (SS) may be performed before communication decision. Measuring the time-of-arrival (TOA) of the transmitted signal may be another step to estimate the signal flight distance from the transmitter to the receiver.

The first path of the multipath signal (τl i,j, i=0, l=0) in one beacon is often called the "TOA path," which may be used to characterize the line-of-sight distance. In some embodiments, for example as part of lowering the overall system complexity and exploiting the similarity feature of the SS and TOA, the Neyman Pearson (NP) criterion may be used in SS to detect the signal region with a fixed false-alarm rate. The result of SS may be used to improve the reliability and accuracy of the TOA estimation, and perform TC-based TOA estimation by maximizing the derived right detection probability.

Symbol Synchronization

To detect the i-th symbol that the beacon signal starts, in some embodiments, a continuous group of Ms points in an Nk interval may be extracted, where Nk interval equals to the symbol rate Ts. This extraction may be performed, for example, to speedup the detection. Due to the bandpass properties of the received signal, a sufficient length of samples may be acquired to cover the whole period of the high frequency signal, e.g., choosing Ms to cover the whole period for the highest frequency component that $Ms \geq (1/f0) \times Fs$. The decision process for symbol detection may be expressed as $$i_s = \min_i \left( \frac{1}{M_s} \sum_{k=iN_k}^{(iN_k+M_s)} |r_{i,j}(k)| > \hat{\eta}_{syn} \right) \quad (11)$$

where min(•) is the function that selects the first i that the decision vector crossing the threshold; ^ηsyn is the threshold for synchronization; |•| is the absolute function to extract the amplitude information. For simplicity, the decision vector may be expressed as $z_i = 1/M_s \sum_{k=iN_k}^{(iN_k+M_s)} |r_{i,j}(k)|$.

One parameter involved in Equation (11) is the synchronization threshold ^ηsyn. To determine this parameter, hypothesis tests may be used to minimize error detection probability. The process of Equation (11) may be to detect the signal from the noise component $n_{i,j}(k)$ with variance of $\sigma^2$. Since each individual sample $r_{i,j}(k)$ is a Gaussian random variable, the first moment of $r_{i,j}(k)$ when a signal is present (often referred to as the H1 condition) may be written as $E(r_{i,j}(k);H1) = \sqrt{\epsilon}E|(Al\ i,j)| \approx \sqrt{\epsilon}\hat{A} = \mu$, $Var(r_{i,j}(k);H1) = \sigma^2$; where $\hat{A}$ is the estimated mean value of the multi-path amplitude ($Al\ i,j$). In the noise region that a signal is not present (referred to as the H0 condition), the statistical parameters of $r_{i,j}(k)$ is $E(r_{i,j}(k);H0)=0$, $Var(r_{i,j}(k);H0)=\sigma^2$. The decision vector $z_i$ is the mean absolute value of $|r_{i,j}(k)|$, and has a folded normal distribution. The probability density function (PDF) of $z_i$ is given by $$f(z_i; \hat{A}, \sigma) = \quad (12)$$

$$\frac{1}{\sqrt{2\pi\sigma^2}} \exp\left(-\frac{(-z_i - \sqrt{\epsilon}\hat{A})^2}{2\sigma^2}\right) + \frac{1}{\sqrt{2\pi\sigma^2}} \exp\left(-\frac{(z_i - \sqrt{\epsilon}\hat{A})^2}{2\sigma^2}\right)$$

where $z_i \geq 0$. The moment may be simplified under H0 condition that $\hat{A}=0$, as $E(z_i)=2/\pi\sigma$, $Var(z_i)=(\pi-2)/\pi\sigma^2$.

After performing the absolute function |•| in Equation (11), the probability that the sample crossing the threshold ^ηsyn in the noise region (H0 condition) can be shown as $$P_{fa}(|r_{i,j}(k)|) = Pr(|r_{i,j}(k)| > \hat{\eta}_{syn}; H_0) = 2Q(\hat{\eta}_{syn}/\sigma) \quad (13)$$

where $\sigma$ is an unknown parameter; Q(x) is the Gaussian Q function. $P_{fa}(|r_{i,j}(k)|)$ is the false alarm rate that detected the wrong sampling point. To estimate $\sigma$, one method is direct using $\hat{\sigma} = E(r_{i,j}(k))^2$ in the noise region. However, using the first moment of the folded normal distribution can lead to a more simplified method as $\hat{\sigma} = \pi/2 E(z_i;H0)$, where it does not need to perform complex $(•)^2$ and $\sqrt{(•)}$ in estimation and really suitable for real-time situations.

With the unknown a prior information, using Neyman Pearson (NP) criterion can achieve improved performance by maintaining a constant false-alarm rate γfa. Thus, the detection threshold (^ηsyn) can be determined by Equation (13) as $$\hat{\eta}_{syn} = \sqrt{\pi/2} E(z_i;H_0) Q^{-1}(P_{fa}(|r_{i,j}(k)|)/2) \quad (14)$$

where $P_{fa}(|r_{i,j}(k)|)$ is the constant false alarm rate that may be pre-set according to application demands; in some embodiments, large values of $P_{fa}(|r_{i,j}(k)|)$ may be achieved at the sacrifice of detection probability. In the first step detection, $P_{fa}(|r_{i,j}(k)|)$ may be set slightly higher such that information loss is mitigated, while the second step in TOA estimation can help to keep the overall $P_{fa}(|r_{i,j}(k)|)$ to a lower level.

With the threshold (^ηsyn) available, the probability that the correct signal is detected in the signal region (H1 condition) is given by $$P_d(|r_{i,0}(k)|) = \quad (15)$$

$$Pr(|r_{i,j}(k)| > \hat{\eta}_{syn}; H_1) = Q\left(\frac{(\hat{\eta}_{syn} - \sqrt{\epsilon}\hat{A})}{\hat{\sigma}}\right) + Q\left(\frac{(\hat{\eta}_{syn} - \sqrt{\epsilon}\hat{A})}{\hat{\sigma}}\right)$$

where $\sqrt{\epsilon}\hat{A}$ is the signal parameter that can be estimated in the signal region as $\sqrt{\epsilon}\hat{A} = E(r_{i,j}(k);H1)$. In some embodiments, by using the detection threshold in Equation (14) with a fixed false alarm rate in Equation (11), the signal start region (^is) may be detected at the probability of Equation (15) and the communication synchronization may be asserted.

TOA Estimation

1) Estimation Procedure:

In some embodiments, when ^is is obtained in Equation (11), further refinements in detection may be performed for the TOA path in the symbol region near ^is. As a non-limiting example, Jump-back and search-forward (JBSF) may be used for follow-up TOA searching after an initial detection. The following notation is used: $z_k = |r_{is,j}(isN_k - J_b, \ldots, isN_k + M_s)|$ as the subtracted decision sequence for TOA estimation, Jb is the number of sampling points that jumped back in JBSF; the length of $z_k$ is $M_k = J_b + M_s + 1$. The decision process in this part can be written as $$\hat{\tau}_i^{TOA} = \begin{cases} T_s \cdot [\min(k|z_k > \hat{\eta}_{TOA}) + \hat{i}_s N_k - J_b] - \frac{1}{2}T_s & k < M_k \\ \text{Re-estimate } \hat{i}_s & k \geq M_k \end{cases} \quad (16)$$

where ^ηTOA is the precise TOA estimation threshold; ^is is obtained in the previous detection stage indicates the symbol period; Jb can be set the same as the step size in the first step detection; i.e., Jb=Nk. In the second condition of Equation (16), there may be no need to re-estimate the signal region when the decision process cannot obtain a TOA value in $z_k$ and $k \geq M_k$, i.e., no sampling point crossed the threshold. In some embodiments, this may be due to the false detection in symbol synchronization, in which case a subsequent step may be to re-estimate ^is. From such process, the overall false alarm rate in SS in Equation (11) may be lowered in TOA estimation.

2) Maximizing the Right Detection Probability:

In some embodiments, referring to Equation (16), the TOA threshold ^ηTOA may be determined before the decision process. The decision vector $z_k$ also follows the folded normal distribution in (12) and with the same statistical parameters. Then the probability that sample $z_k$ crossing the threshold in the noise and signal region can be calculated as the way in (13) and (15); shown as Pfa(zk) and Pd(zk), respectively. The probability that detected the right TOA path can be denoted as Prt, the two kind TOA estimation errors are the early detection Ped and late detection Pld. Ped is caused by selecting the incorrect crossing samples earlier to true TOA path due to noise interference; Pld is the probability that the TOA estimator missed the true TOA path, and detected a wrong sample in the signal region later due to channel fading. Assume the true TOA path $kTOA_j$ is uniformly distributed in the region of the estimation area $(i_sN_k-J_b, \ldots, i_sN_k+M_s)$ with total length of $M_k=J_b+M_s+1$. The probability that the true TOA path in any sampling point is $p_{toa}=1/M_k$. The early detection probability that detected one point in noise region is $P_{ed}(kTOA_j)=1-(1-P_{fa}(z_k))^{kTOA\,j}$, which means at least one sample crossed the threshold before TOA path. The late detection $P_{ld}(kTOA_j)=(1-P_d(z_k))(1-P_{fa}(z_k))^{kTOA\,j}$ shows the TOA point is missed. The right detection probability is $P_{rt}(kTOA_j)=P_d(z_k)(1-P_{fa}(z_k))^{kTOA_j}$, where $\_(P_{ed}(kTOA\,j)+P_{rt}(kTOA\,j)+P_{fa}(kTOA\,j))=1$. Since $kTOA\,j$ is uniformly distributed with probability $p_{toa}$, the expectation for the error estimation probability over $kTOA\,j$ is $$P_{err}^{TOA} = E_{k_j^{TOA}}(P_{ext}(k_j^{TOA}) + P_{fa}(k_j^{TOA}))) = \quad (17)$$

$$\sum_{k_j^{TOA}=0}^{M_k} \left( \frac{1}{M_k} \left[ 1-(1-P_{fa}(z_k))^{k_j^{TOA}} \right] \right) +$$

$$\sum_{k_j^{TOA}=0}^{M_k} \left( \frac{1}{M_k} \left[ (1-P_d(z_k))(1-P_{fa}(z_k))^{k_j^{TOA}} \right] \right) =$$

$$1 - \frac{P_d(z_k)}{M_k P_{fa}(z_k)} [1-(1-P_{fa}(z_k))_k^M]$$

where the last part of Equation (17) is the correct detection probability $PTOA\,rt=P_d(z_k)[1-(1-P_{fa}(z_k))^{Mk}]/M_kP_{fa}(z_k)$. Performing Taylor expansion of $(1-P_{fa}(z_k))^{Mk}$ yields $(1-P_{fa}(z_k))^{Mk}\approx 1-M_kP_{fa}(z_k)+C^2_{M_K}(P_{fa}(z_k))^2$. Then $PTOA\,rt$ can be simplified as $$P_{rt}^{TOA} \approx \frac{P_d(z_k)}{M_k P_{fa}(z_k)} \left( M_k P_{fa}(z_k) - C_{M_k}^2 (P_{fa}(z_k))^2 \right) = \quad (18)$$

$$P_d(z_k) \left[ 1 - \frac{1}{2}(M_k-1) P_{fa}(z_k) \right]$$

Equation (10) implies that an increase $P_d(z_k)$ or decrease $P_{fa}(z_k)$ of the single sampling point can contribute improved $PTOA\,rt$. Small $M_k$ also helps to improve the performance that less sampling points being detected.

One example of a technique to achieve a better TOA estimation scheme is to select a TOA threshold by maximizing $PTOA\,rt$. Since $P_d(z_k)$ and $P_{fa}(z_k)$ is a function of $\hat{\eta}TOA$, $PTOA\,rt$ can be written as $PTOA\,rt\,(\hat{\eta}syn)$. The maximum value of $PTOA\,rt$ can be achieved when $\hat{\eta}TOA=\hat{\eta}oth\,TOA$, as $$\hat{\eta}_{TOA}^{oth} = \underset{\hat{\eta}_{TOA}}{\arg\max} (P_{rt}^{TOA}(\hat{\eta}_{TOA})) \quad (19)$$

For simplification, the Maclaurin series of the error function $\mathrm{erf}(x)=\sqrt{2}\,\pi\_\infty\,n=0[(-1)^n x^{2n+1}]/[n!(2n+1)]$ may be used to express the approximate function of $Q(x)$ as $$Q(x) \approx \frac{1}{2} - \frac{1}{2}\mathrm{erf}(x/\sqrt{2}) = \frac{1}{2} - \frac{1}{\sqrt{\pi}}\left( x/\sqrt{2} - \frac{(x/\sqrt{2})^3}{3} + \ldots \right) \quad (20)$$

when $x$ is very small, even the first-order term of Equation (20) can well represent $Q(x)$ as $Q(x)\approx 1/2-x/\sqrt{2\pi}$. Defining $z=\hat{\eta}syn/\hat{\sigma}$ and $s=\sqrt{\epsilon}\hat{A}/\hat{\sigma}$. If one only considers the scenario of $s>0$, then $P_d(z_k)$ and $P_{fa}(z_k)$ can be simplified as $P_d(z_k)\approx 1/2-(z-s)/\sqrt{2\pi}$ and $P_{fa}(z_k)\approx 1-2z/\sqrt{2\pi}$.

By substituting $P_d(z_k)$ and $P_{fa}(z_k)$ into (10), and define $w=1\,2\,(M_k-1)$, $PTOA\,rt$ can be written as $$P_{rt}^{TOA}(z) = [1/2-(z-g)/\sqrt{2\pi}][1-w(1-2z/\sqrt{2\pi})] = \quad (21)$$

$$-\frac{w}{\pi}z^2 + \left(\frac{2w-1}{2\sqrt{2\pi}} + \frac{wg}{\pi}\right)z + \frac{1-w}{\sqrt{2\pi}}s + \frac{1-w}{2}$$

where Equation (21) is a convex function with its maximum achieved when $z=s\,2+\sqrt{\Pi}2\sqrt{2}(1-1\,2w)$. Then, $\hat{\eta}oth\,TOA$ can be written as $$\hat{\eta}_{TOA}^{oth} = \frac{1}{2}\sqrt{\epsilon}\,\hat{A} + \frac{\sqrt{\pi}}{2\sqrt{2}}\left(1 - \frac{1}{M_k-1}\right)\hat{\sigma} \quad (22)$$

Where $\sqrt{\epsilon}\hat{A}$ and $\hat{\sigma}$ can be estimated as the same in (14). In some embodiments, by using (22) in TOA estimation of (16), improved TOA performance can be achieved under the criterion of maximum right detection probability as shown in (19).

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of determining location of a portable electronic device within a region, the method comprising:
   emitting acoustic signals with a frequency bandwidth of about 17 to 20 KHZ from each of a plurality of source devices, the plurality of source devices being controlled to emit acoustic signals with an identifier of the respective source device at synchronized times, wherein each identifier of the respective source device is orthogonal to each of the other identifiers of the plurality of source devices;
   receiving at a microphone on the portable electronic device acoustic signals from at least a portion of the plurality of source devices, wherein at least two acoustic signals of the acoustic signals comprise the same identifier and have different times of receipt at the microphone;
   selecting from the at least two acoustic signals the acoustic signal with an earlier time of receipt;
   performing code matching to identify a plurality of identifiers from the acoustic signals;
   computing from the received acoustic signals a position of the portable electronic device with a resolution of less than 10 cm based at least in part on known location information of the source devices associated with the plurality of identifiers; and automatically rendering information to a user of the portable electronic device selected based on the computed position.

2. The method of claim 1, wherein computing from the received acoustic signals a position of the portable electronic device comprises:

transmitting information derived from the received acoustic signals to a remote server;

calculating, at the remote server, a position of the portable electronic device based on the transmitted portion of the received acoustic signals;

receiving, from the remote server, the calculated position of the portable electronic device.

3. A portable electronic device comprising:

a user output component;

a voice microphone configured to receive voice input; and a processor, wherein the processor is configured to process acoustic signals received through the voice microphone to select acoustic signals with amplitude exceeding a threshold, wherein each acoustic signal of the selected acoustic signals comprises a symbol associated with a source device, compute relative times of arrival of selected acoustic signals by synchronizing a pattern of transmission times of the selected acoustic signals with a list of symbols to obtain times of arrival of the selected acoustic signals with symbols associated with respective source devices, determine, based at least in part on the computed relative times of arrival of acoustic signals, a location of the portable electronic device with a resolution of less than 30 cm and render information through the user output component selected based on the determined location.

4. The portable electronic device of claim 3, wherein:

the portable electronic device comprises a commercially available smartphone configured with an app.

5. The portable electronic device of claim 4, wherein:

the app controls the smartphone to acquire the information rendered through the user output component over a wide area network.

6. The portable electronic device of claim 3, wherein the processor is configured to process acoustic signals received through the voice microphone to determine a location of the portable electronic device by:

identifying non-line-of-sight (NLOS) signals from the received acoustic signals;

computing the location of the portable electronic device based at least in part on the received acoustic signals that are not NLOS signals.

7. The portable electronic device of claim 3, wherein the acoustic signals are emitted from each of a plurality of source devices and have a frequency bandwidth of about 17 to 20 KHz.

8. The portable electronic device of claim 3, wherein the processor is further configured to perform distance updating, wherein the distance updating comprises determining an updated time-of-arrival based on incremental information received from the acoustic signals.

9. The portable electronic device of claim 8, wherein the distance updating comprises computing an average of at least one past time-of-arrival estimate and a current time-of-arrival estimate.

10. The portable electronic device of claim 3, wherein the processor is configured to dynamically select the threshold based at least in part on a false alarm rate and an average amplitude of the received acoustic signals.

11. At least one non-transitory computer-readable storage medium comprising computer-executable instructions that, when executed by at least one processor of a device having a user output component and a voice microphone configured to receive voice input, perform of a method of:

receiving a plurality of acoustic signals through the voice microphone at each of a plurality of times, wherein each acoustic signal of the plurality of acoustic signals comprises a unique symbol associated with a source device and wherein at least two acoustic signals of the plurality of acoustic signals comprise the same symbol and have different times of receipt at the voice microphone;

selecting from the at least two acoustic signals of the plurality of acoustic signals the acoustic signal with an earlier time of receipt;

synchronizing a pattern of transmission times of the plurality of acoustic signals with a list of symbols to obtain times of receipt of the selected acoustic signals with symbols associated with respective source devices;

based on the times of receipt of the selected acoustic signals, determining a relative position between the device and respective sources of the plurality of acoustic signals with a resolution of less than 30 cm;

based on locations of the sources of the acoustic signals, determining a position of the device;

selecting information based on the determined position; and rendering the selected information on the user output component.

12. The at least one non-transitory computer-readable storage medium of claim 11, wherein:

the computer-executable instructions comprise a smartphone app.

13. The at least one non-transitory computer-readable storage medium of claim 11, wherein:

selecting information comprises interacting with at least one server to obtain information associated with locations within a region.

14. The at least one non-transitory computer-readable storage medium of claim 11, wherein:

determining the position of the device comprises tracking the position of the device in real-time.

* * * * *